(12) United States Patent
Jennemann et al.

(10) Patent No.: US 6,604,269 B2
(45) Date of Patent: Aug. 12, 2003

(54) MACHINE TOOL

(75) Inventors: Arnold Jennemann, Waldsolms-Brandoberndorf (DE); Klaus Bergmann, Offenburg (DE); Berthold Bauer, Markgröningen (DE)

(73) Assignees: Vickers Systems (DE); Witzig & Frank Turmatic GmbH (DE)

( * ) Notice: Subject to any disclaimer, the term of this patent is extended or adjusted under 35 U.S.C. 154(b) by 0 days.

(21) Appl. No.: 09/180,400

(22) PCT Filed: May 8, 1997

(86) PCT No.: PCT/EP97/02366

§ 371 (c)(1),
(2), (4) Date: Jul. 9, 1999

(87) PCT Pub. No.: WO97/43085

PCT Pub. Date: Nov. 20, 1997

(65) Prior Publication Data

US 2002/0026700 A1 Mar. 7, 2002

(Under 37 CFR 1.47)

(30) Foreign Application Priority Data

May 9, 1996 (DE) .......................... 196 18 757

(51) Int. Cl.⁷ .............. B23Q 5/06; B23C 5/28; B23C 1/08; B23C 1/00
(52) U.S. Cl. .............. 29/42; 409/230; 409/231; 409/135; 409/136; 408/130
(58) Field of Search ............ 29/40, 42; 409/230, 409/135, 136, 231–232; 92/71; 60/484; 408/124, 130

(56) References Cited

U.S. PATENT DOCUMENTS

| | | | | |
|---|---|---|---|---|
| 3,154,983 A | * | 11/1964 | Firth et al. ............. | 91/499 |
| 3,249,061 A | * | 5/1966 | Ricketts ............... | 91/486 |
| 3,304,051 A | | 2/1967 | Calhoun | |
| 3,726,348 A | * | 4/1973 | Seegan ................. | 408/16 |
| 3,946,491 A | * | 3/1976 | Baily et al. ........... | 33/23.01 |
| 4,008,774 A | | 2/1977 | Milano et al. | |
| 4,229,139 A | | 10/1980 | Marantette et al. | |
| 4,620,475 A | * | 11/1986 | Watts .................. | 92/57 |
| 4,693,646 A | * | 9/1987 | Andrews ............... | 409/136 |
| 4,913,605 A | * | 4/1990 | Schwartzman ........... | 409/231 |
| 5,146,663 A | * | 9/1992 | Buessinger ............ | 29/40 |
| 5,423,183 A | * | 6/1995 | Folsom ................ | 92/71 |
| 5,564,872 A | * | 10/1996 | Veil et al. ............ | 409/230 |
| 5,657,629 A | * | 8/1997 | Folsom et al. ......... | 60/487 |
| 5,941,157 A | * | 8/1999 | Tokumasu ............. | 92/71 |
| 6,398,468 B1 | * | 6/2002 | Bayer et al. .......... | 409/135 |

FOREIGN PATENT DOCUMENTS

| | | | |
|---|---|---|---|
| DE | 19642975 | * | 11/1997 |
| EP | 0661133 | | 7/1995 |
| FR | 2182630 | | 12/1973 |
| FR | 2211862 | | 7/1974 |
| FR | 2223134 | | 10/1974 |
| GB | 1013041 | | 12/1965 |

OTHER PUBLICATIONS

*The Tool and Manufacturing Engineer*, vol. 59 (Aug. 1967) pp. 32–34.

* cited by examiner

Primary Examiner—A. L. Wellington
Assistant Examiner—Erica E. Cadugan
(74) Attorney, Agent, or Firm—Dinsmore & Shohl LLP (57) ABSTRACT

The invention pertains to a machine tool for processing workpieces with tools, wherein the machine tool has a spindle housing that contains a spindle shaft and accommodates at least one tool as well as a drive device that causes a rotational movement of the spindle shaft. The machine tool is characterized by the fact that the drive device (3) contains a hydraulically operated displacement machine or swash plate device.

15 Claims, 5 Drawing Sheets

MACHINE TOOL

The invention pertains to a machine tool for processing workpieces with tools, wherein the machine tool has a spindle housing that contains a spindle shaft and accommodates at least one tool as well as a drive device that causes a rotational movement of the spindle shaft.

Machine tools of this type are known. They contain a spindle shaft that is arranged in a housing and transmits a drive torque to a tool. The spindle shaft is driven by an electric motor, the drive shaft of which transmits a drive torque to an angular wheel that is connected to the spindle shaft in rotational play via a gear. The angular wheels that transmit the drive torque to the spindle shaft must be very exactly aligned relative to one another so as to keep their wear, the heating of the drive train and the components located next to the drive train as well as the noise of the machine tool to a minimum. In this respect, the precise axial-spacing of the angular wheels is particularly important because an excessively large or excessively small axial distance results in high wear and, in certain instances, damage to the drive train. However, this requires a significant expenditure with respect to the manufacturing technology. A lubricating oil supply that requires a separate conduit system also must be provided in order to lubricate the angular wheels.

The invention is based on the objective of developing a machine tool of the initially mentioned type that has a simple design and that can be inexpensively manufactured and easily serviced.

This objective is attained with a machine tool for processing workpieces with tools, having a spindle housing that contains a spindle shaft and accommodates at least one tool, and having a drive device that causes a rotational movement of the spindle shaft. This machine tool is characterized by the fact that the drive device contains a hydraulically operated displacement machine. Due to the operating medium circuit or conduit system required for operating the displacement machine, no additional lubricating oil circuit is required. The preferred operating medium for the displacement machine is hydraulic oil with superior lubricating and cooling properties, wherein any incompressible medium may, in principle, be used. The lubrication and the cooling of the moving parts arranged in the spindle housing are simply carried out by the existing hydraulic oil supply of the displacement machine such that the manufacturing costs of the machine tool are reduced. In addition, a displacement machine arranged in a stable housing only produces low running noises, i.e., the operating noise is also reduced. A drive device that contains a displacement machine has a simple design and is operationally very safe. In addition, such a drive device practically requires no maintenance due to the very low wear. Consequently, the manufacturing and operating costs of the machine tool are very low. In addition, relatively large tolerance ranges can be realized, e.g., with respect to the arrangement of the hydraulic conduit system. Consequently, the manufacturing expenditure is relatively low.

One preferred embodiment of the machine tool is characterized by the fact that the drive device is exclusively formed by the displacement machine. A gear that transmits the drive torque and different speeds to the spindle shaft is not required if a displacement machine is utilized as the drive device. In order to influence the speed, the volume flow introduced into the displacement machine need only be varied or correspondingly adapted, wherein the pressure of the incompressible medium is varied or correspondingly adapted in order to change the drive torque. The constructive expenditure for such control of the speed and the drive torque is relatively low, i.e., the cost of the machine tool is reduced.

According to one particularly preferred embodiment of the machine tool, the drive device is realized in the form of an axial piston machine, in particular, a swash-plate machine, that has high power in relation to its structural dimensions. In this case, the speed of the drive shaft can be simply varied by means of an adjustable angular block that changes the displacement volume of the piston. A compact machine tool with small dimensions can be realized due to this reduction of the required structural space.

In another preferred embodiment of the machine tool, the drive device and the spindle housing form a drive unit. The drive device may be flanged onto or integrated into the spindle housing such that a particularly compact structural shape is attained. The spatial distance between the drive device and the spindle housing is, due to the design of the drive unit, so small that power/torque transmission elements, e.g., gears, articulations or the like, can be eliminated. This is possible because the spindle shaft replaces the driven shaft of the drive device and is directly driven by this drive device. Due to the elimination of drive train components which transmit forces and are subject to wear, the spindle shaft can be driven practically without slip. In addition, this drive unit is characterized by a compact, modular design and a relatively low running noise. The running noise is, in particular, reduced by a stable spindle housing and/or a stable housing of the drive unit such that the noise level caused by the machine tool is reduced. Due to the combination of the spindle shaft and the drive unit, the constructive expenditure as well as the expenditure with respect to the manufacturing technology are relatively low, i.e., the manufacturing costs are correspondingly reduced.

Another particularly preferred embodiment of the machine tool is characterized by the fact that the drive unit can be inserted into a spindle head that carries several drive units. Different tools are usually arranged on such a spindle head. The spindle head is used, for example, in automated manufacturing machines, e.g., in a CNC-controlled milling machine. Due to the modular design of the spindle housing and the drive device, a tool change can be carried out very fast such that the down time of the machine tool is significantly reduced. In addition, a drive device with a different speed or power can be provided for each tool, wherein the respective drive devices are adapted to the operating specifications of the respective tool. Thus, the control expenditure for the machine tool can be significantly simplified.

Additional advantageous embodiments are disclosed in the remaining subordinate claims.

The invention is described in detail below with reference to the figures. The figures show.

Figure 1:
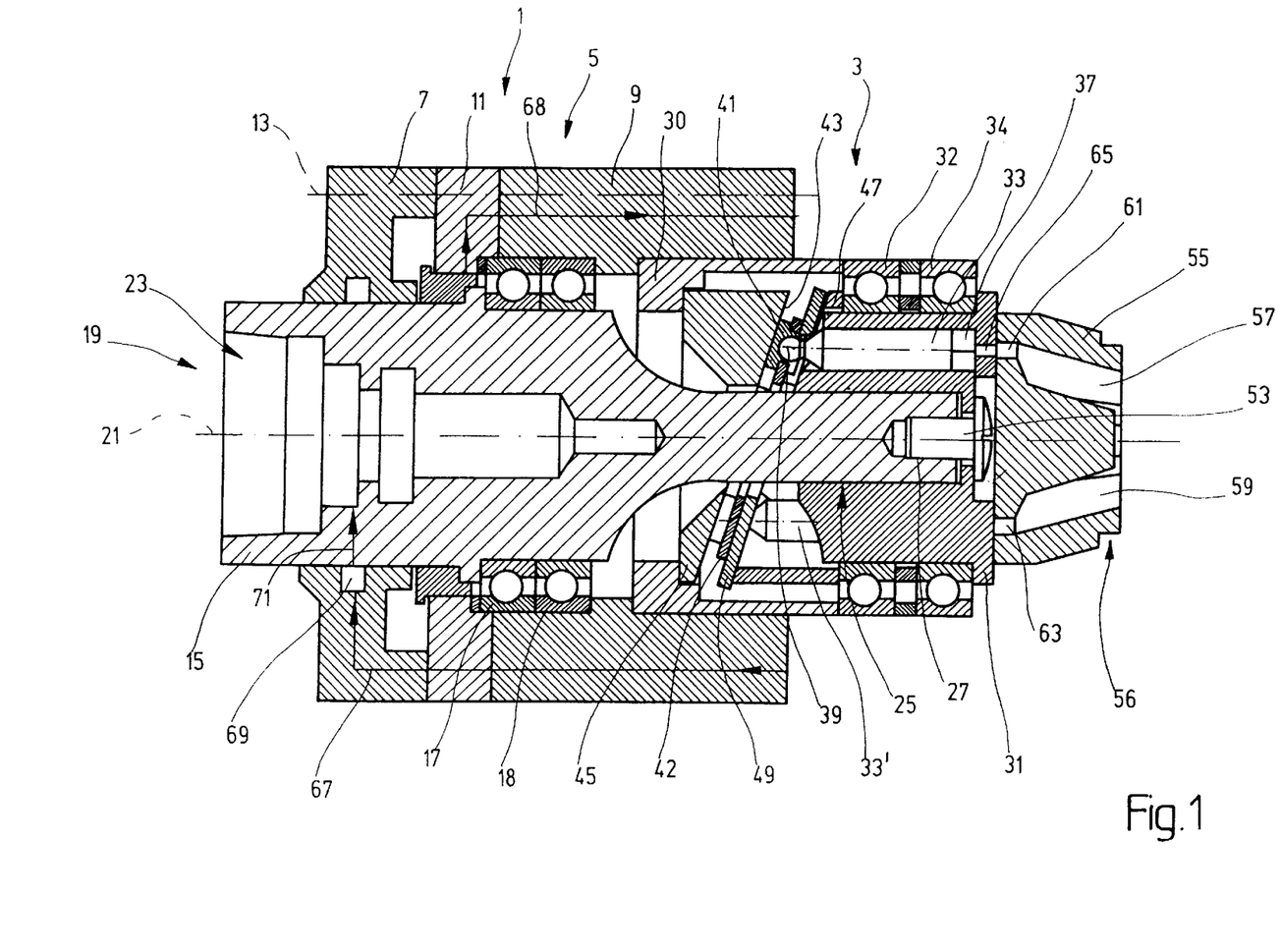
FIG. 1, a schematic sectioned side view of a driving device.

FIG. 1 shows a sectioned side view of a drive unit 1 for a machine tool that is formed by a drive device 3 and a spindle housing 5. The spindle housing 5 contains a cover-like first housing part 7 and a block-like second housing part 9. The housing parts 7 and 9 are connected to one another via an intermediate plate 11 arranged between said housing parts, i.e., by means of several fastening screws. In order to provide a better overview, these fastening screws are not illustrated in the figure, wherein a dotted-dashed line 13 indicates their longitudinal axis or their position in the spindle housing 5. However, it is also possible to realize the spindle housing 5 in one piece such that the manufacturing expenditure for the spindle housing is reduced.

In the second housing part 9 of the spindle housing 5, a spindle shaft 15 is rotatably held by two jointly prestressed bearings 17 and 18 which are realized in the form of rolling element bearings in this case. The spindle shaft 15 is realized integrally with a tool receptacle 19, of which merely several inner contours 23 that are arranged concentric to the central axis 21 are shown. These inner contours have different diameters. Arbitrary tool receptacle shapes and contours can be machined into the spindle shaft or produced during the manufacture of the spindle shaft. Tools can be directly inserted into the tool receptacle and subsequently fastened therein. The tool receptacle is preferably realized in such a way that an adaptor which carries at least one tool can be inserted into the tool receptacle, in particular, in plug-in fashion. This means that a tool change on the drive unit can be carried out very fast. On its end which faces away from the tool receptacle 19, the spindle shaft 15 contains a taper 25 with a threaded bore 27 that is aligned with the central axis 21.

In this case, the drive devices 3 is realized in the form of a swash-plate machine and contains a sleeve-shaped motor housing 30 that partially protrudes into the second housing part 9 of the spindle housing 5, wherein the motor housing is held and fixed in this second housing part. A cylinder block 31 that is rotatably held by two jointly prestressed bearings 32 and 34 protrudes into the motor housing 30. The cylinder block 31 contains an inner bore, in which the taper 25 of the spindle shaft 15 is held without rotational play, in particular, by means of a press fit or press toothing. This means that the spindle shaft 15 is connected to the cylinder block 31 without play. A fastening screw 53 that extends through a recess in the cylinder block 31 is screwed into the threaded bore 27 and serves for absorbing forces that occur or act upon the spindle shaft 15 in the axial direction, i.e., the spindle shaft is fixed and securely held.

Several bores that extend parallel to the central axis 21 are arranged in the cylinder block 31. One respective piston is guided in each bore, preferably with a play of approximately 1/100 mm. In the embodiment shown in FIG. 1, nine pistons are arranged in the cylinder block. However, it is possible to provide a different number of pistons, e.g., 7, 9, 11, 13 etc., wherein a higher number of pistons improves the synchronous running and reduces the structural size of the displacement machine. The bores are separated within a certain angular range, namely on an imaginary circle that lies concentric to the central axis 21. In the plane of section shown in FIG. 1, only the piston 33 guided in the bore 37 and the piston 33' are visible. In the position shown, the piston 33 is arranged approximately within the region of top dead center, i.e., the piston 33 has mostly moved into the bore 37. The piston 33' is arranged within the region of bottom dead center, i.e., it has mostly moved out of its bore. Due to the identical design of the pistons and the bores, the following description simply refers to the design and kinematics of the piston 33.

On its end situated on the bearing side, the piston 33 contains a ball-shaped articulation 39 that is arranged in a sliding block 41. The articulation 39 extends through recesses in a bearing plate 49, an angular sleeve 47 and a perforated plate 42. The sliding block 41 is supported on a sliding surface 43 that is realized in the form of an oblique plane and forms part of a stationary angular block 45. The sliding surface 43 extends at an angle to an imaginary vertical line and limits the stroke of the piston.

A control disk 55 adjoins the end face of the cylinder block 31 which protrudes from the spindle housing 5. An inlet channel 57 and an outlet channel 59 extend through this control disk. The inlet channel 57 is connected to a hydraulic oil supply, wherein highly pressurized hydraulic oil flows through said inlet channel. On the side of the control disk 55 that adjoins the cylinder block 31, the oil flows out of the control disk 55 through an annular, groove-like recess 61 that has the shape of a kidney, whereafter the oil is introduced into the cylinder block through an opening 65 that ends in the bore 37. Subsequently, the piston 33 which is shown in its inserted position in FIG. 1 is pressed outward, i.e., it carries out a retraction movement such that the sliding block 41 is moved along the oblique plane (sliding surface 43) of the angular block 45. This causes a rotational movement of the cylinder block 31 and the spindle shaft 15. The sliding block 41 arranged between the perforated plate 42 and the sliding surface 43 of the angular block 45 slides on the oblique plane in the direction of the bottom dead center of the swash-plate machine, wherein hydraulic oil constantly flows into the bore 37 through the annular, groove-like recess 61. Viewed in the rotating direction of the cylinder block 31, the recess 61 ends before the bottom dead center is reached. After passing the bottom dead center, the piston 33 that is guided by the sliding surface 43 is again pushed into the cylinder block 31, wherein the hydraulic oil situated in the bore 37 is discharged through an annular, groove-like recess 63 in the control disk 55 which has the shape of a kidney and returned into the oil circuit through the outlet channel 59. Due to the rotational movement of the cylinder block 31, the spindle shaft 15 that is connected without rotational play thereto also rotates, wherein the transmitted torque and the speed can be adapted to the respective requirements for processing a workpiece by varying the volume flow, the pressure of the hydraulic oil or the structural dimensions of the drive device.

The recesses 61 and 63 may be arranged in the control disk 55 in the cylinder block 31 or in both components. They respectively extend over an angular range of preferably not quite 180°, wherein said recesses are arranged in such a way that a separation between the high-pressure side and the low-pressure side of the displacement machine is realized at top dead center and bottom dead center.

The direction of rotation of the cylinder block 31 and the spindle shaft 15 can be simply reversed by charging the outlet channel 59 of the stationary control disk with the highly pressurized hydraulic oil, i.e., the outlet channel is utilized as the inlet channel. In this case, the inlet channel 57 of the control disk 55 acts as the outlet channel. The structural design of the displacement machine consequently allows a reversal of the direction of rotation of the spindle shaft with very simple means. However, a reversal of the direction of rotation may also be realized by arranging a pivoted swash plate in the displacement machine instead of the angular block. This swash plate is—analogously to the angular block 45—arranged at an angle to an imaginary vertical line and contains a sliding surface 43 that is realized in the form of an oblique plane. The pivoting of the swash plate is realized by reversing the inclination of the sliding surface 43 that is realized in the form of an oblique plane, i.e., if the oblique plane has an ascending progression, the ascending progression is reversed by pivoting the swash plate such that the oblique plane subsequently has a descending progression. This means that the inclination relative to the vertical line is reversed. In this case, the inlet channel and the outlet channel need not be interchanged, i.e., a pivoting of the sliding surface suffices for causing a change in the direction of rotation of the cylinder block.

A bore 67 that serves as a lubricant supply for the tool situated in the tool receptacle 19 is schematically illustrated in the spindle housing 5 of the drive unit 1. The bore 67 which extends through the second housing part 9, the intermediate plate 11 and the first housing part 7 ends in an annular groove 69 arranged in the housing part 7 and lubricates as well as cools the tool via a recess or bore 71 in the spindle shaft, wherein a fluid connection exists between the annular groove 69 and the recess or bore.

FIG. 1 shows an additional bore 68 that originates between a schematically illustrated shaft seal that consists of several parts and the bearing 17 in the intermediate plate 11. This bore serves for discharging leakage oil from the spindle housing. The leakage oil emerges between the cylinder block and the piston and between the sliding blocks and the annular block, wherein said leakage oil is transported into the region of the bore 68 via the bearings 17 and 18. An additional region in which leakage oil flows is situated between the cylinder block 31 and the control disk 55. The leakage oil serves for lubricating and cooling all moving parts, i.e., complicated cooling and lubricating devices can be eliminated. The previous explanation indicates that the hydraulic oil fulfills several functions.

Figure 2:
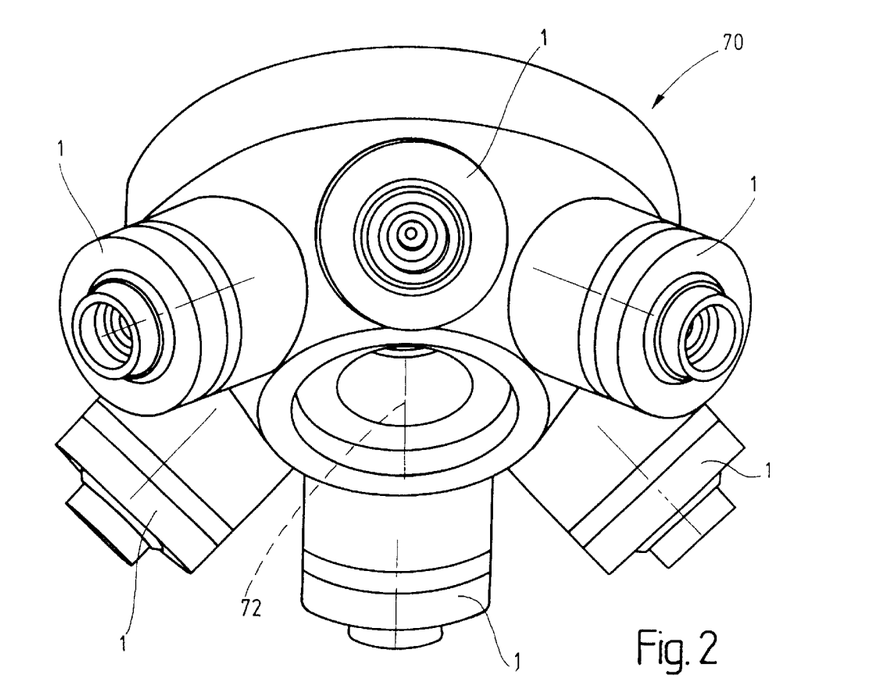
FIG. 2, a perspective representation of a spindle head with several drive units.

FIG. 2 shows a perspective representation of a spindle head 70, on which six drive units 1 are arranged. The spindle head 70 has an outer surface that resembles a truncated cone, wherein openings (recesses) for accommodating the drive units 1 are machined into the outer surface of the spindle head. The spindle head 70 can be turned about an axis that is indicated by reference numeral 72 in FIG. 2. When processing a workpiece, each of the drive units 1 can be moved into operating position, in which the respective tool assumes a defined position relative to the workpiece to be processed.

Figure 3:
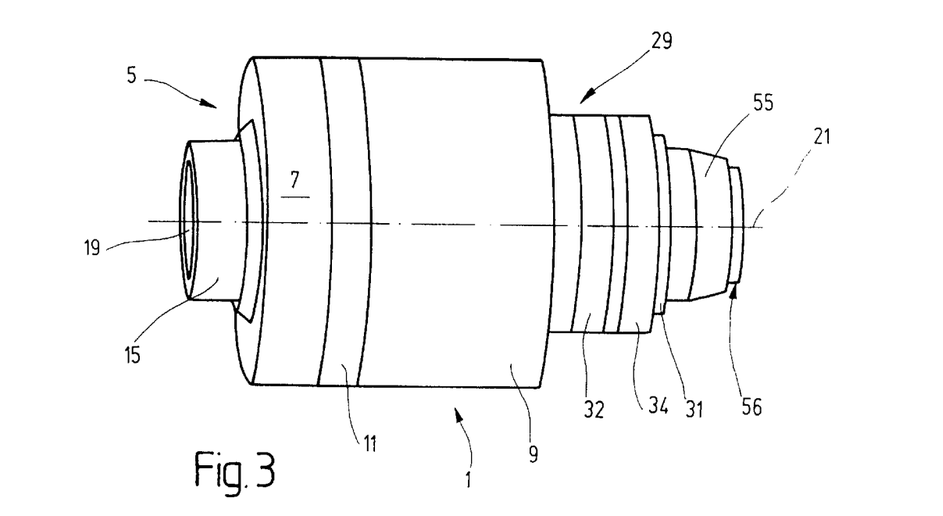
FIG. 3, a perspective representation of the drive unit according to FIG. 1.

FIG. 3 shows a perspective representation of a drive unit 1, the cylindrical body of which has a closed surface. The control disk 55 which adjoins the end face of the cylinder block 31 is arranged on the drive unit in such a way that the kidney-shaped recesses 61 and 63 which extend over an angular range of almost 180° are relative to the maximum inward and outward movement of the piston 33, arranged such that there is a separation between the high-pressure region and the low-pressure region of the displacement machine. A spring, in particular, a plate spring packet, which is not shown in this figure is arranged on an annular collar 56 of the control disk 55. The function of this spring is described below.

The drive unit 1 is inserted into a corresponding recess of the spindle head 70 such that the drive device 3 or the control disk 55, points forward. In this case, the plate spring packet arranged on the annular collar 56 is supported in the recess of the spindle head, i.e., the spring packet is compressed. Due to the compression of the plate springs, the control disk 55 is pressed against the cylinder block 31 with a defined force such that both bearings 32 and 34 of the cylinder block are prestressed. The control disk 55 is placed into the recess of the spindle head in such a way that the high-pressure connection (supply) and the low-pressure connection (discharge) at least partially overlap the inlet channel 57 and the outlet channel 59 of the control disk 55 and a fluid connection is produced. The leakage oil emerging between the control disk and the cylinder block is transported into the spindle head 70 via the recess that accommodates the drive unit 1. Consequently, the spindle head is lubricated and cooled.

The torque acting upon the spindle shaft 15 can be adjusted by varying the size of the motor components of the displacement machine. The angular block 45 which defines the displacement volume of the piston bores as well as the size of the cylinder block 31 and the pistons essentially define the intensity of the drive torque. However, the drive torque can also be influenced by varying the pressure of the hydraulic oil flowing into the cylinder block 1. At a given load, practically any speed can be realized, by means of a corresponding control in the supply/discharge of the hydraulic oil, e.g., a throttle. Different sizes of the drive unit or the displacement machine can be realized for particularly high torques at low speeds or particularly high speeds at low torques. In addition, it is possible to change the angle of the angular block by means of a control piston in order to realize a higher torque or a higher speed while the pressure and the volume flow remain constant.

The materials for the individual components of the drive unit are chosen such that damage to the spindle shaft is practically precluded if a malfunction occurs during the processing of a workpiece, e.g., due to a programming error of the machine tool. The forces occurring during such a malfunction are introduced into the robust spindle housing via the bearings 17 and 18 and from the spindle housing into the spindle head. If damage occurs in one of the drive units of the spindle head, the respective drive unit can be rapidly exchanged without requiring fitting procedures and/or the removal of the entire spindle head.

Figure 4:
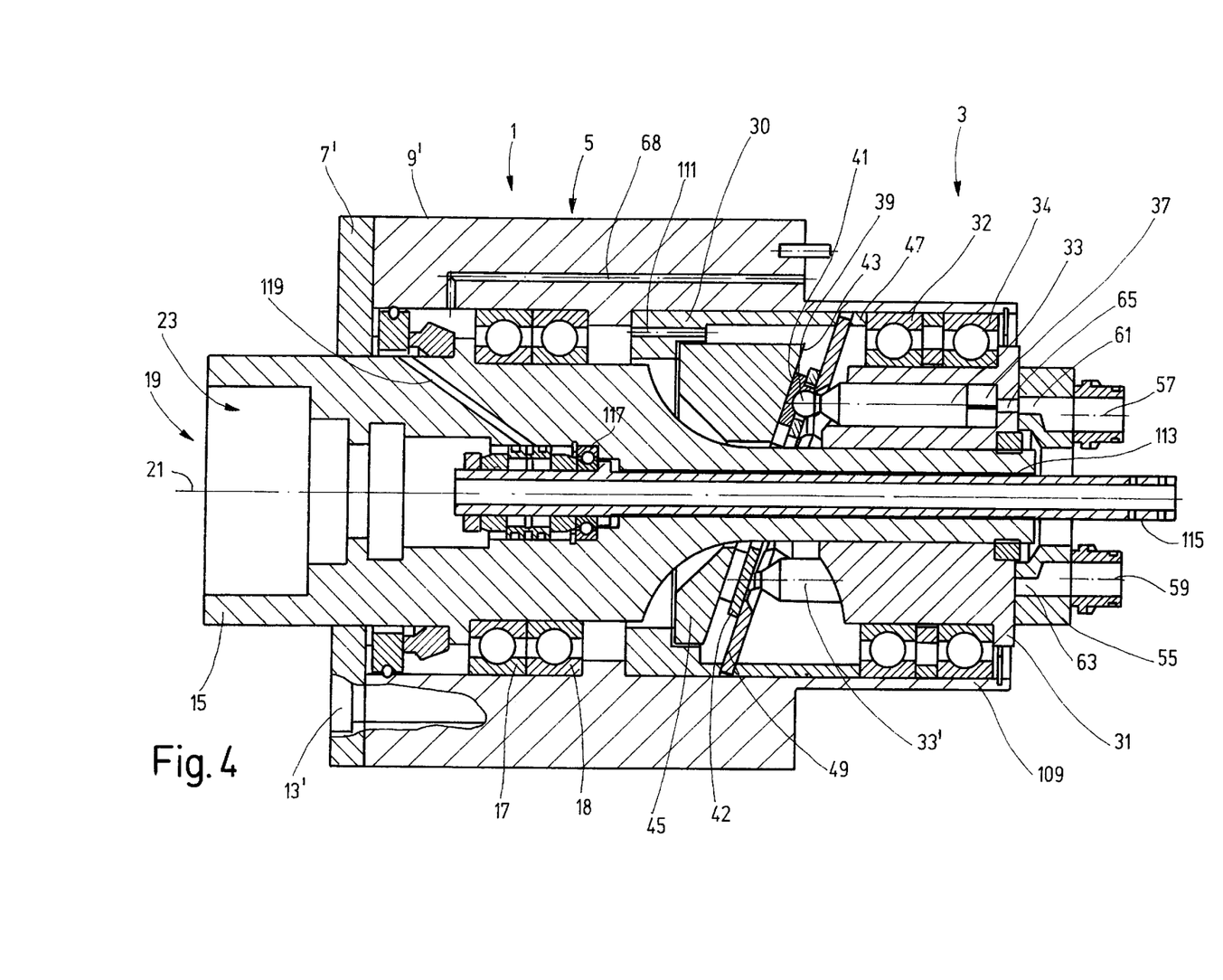
FIG. 4, a schematic sectioned side view of a driving device according to a second embodiment.

FIG. 4 shows a second embodiment of a drive unit 1 for a machine tool. This drive unit essentially corresponds to the drive unit according to FIG. 1, i.e., a repeated description of components represented by identical reference symbols is not provided.

The spindle housing 5 contains a first housing part 7' that is realized in the form of a cover plate and a second, cylindrical housing part 9'. In contrast to the first embodiment according to FIG. 1, the two housing parts 7' and 9' are directly connected to one another by means of several fastening screws, of which only one screw 13' is shown in the figure so as to provide a better overview.

In contrast to the first embodiment according to FIG. 1, the second housing part 9' contains an extension 109 which extends in the longitudinal direction and has a smaller outside diameter. The extension 109 surrounds the drive device 3 and supports, in particular, the two bearings 32 and 34.

A bore 111 is machined into the end face of the sleeve-shaped motor housing 30 which faces the tool receptacle 19. This bore produces a fluid connection between the drive device 3 and the bearings 17 and 18 of the spindle housing 5.

A bore 113 is machined into the spindle shaft 15 so that it extends through the spindle shaft concentrically to the central axis 21. A tubular connecting channel 115 is placed into this bore 113. The end of this connecting channel which faces the tool receptacle 19 is supported on the inner contour 23 via bearings 117, wherein the other end of the connecting channel 115 extends through the control disk 55. The connecting channel 115 is supported in the spindle shaft 15 in such a way that the spindle shaft is able to rotate while the connecting channel 115 remains stationary.

FIG. 4 also indicates that a channel 119 is provided in the spindle shaft 15. This channel extends transverse to the longitudinal axis 21 and produces a fluid connection between the region of the bearing 117 and the region of the two bearings 17 and 18. Naturally, the region of the bearing 117 is sealed toward the tool receptacle 19.

The function of this drive unit 1 corresponds to that of the drive unit according to FIG. 1, i.e., a repeated-description is not provided.

Figure 5:
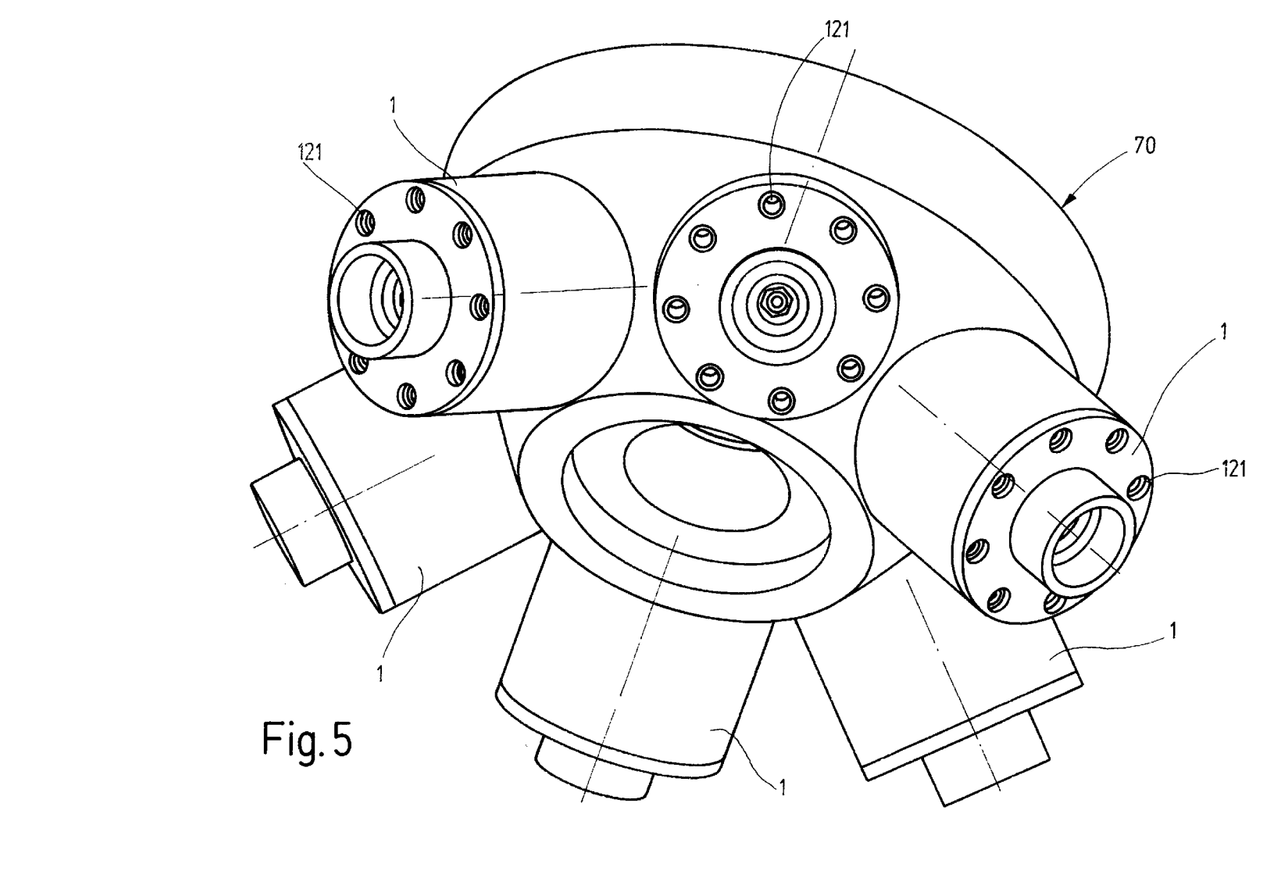
FIG. 5, a perspective representation of a spindle head with several drive units according to FIG. 4.

FIG. 5 shows a perspective representation of a spindle head 70, on which six drive units 1 are arranged. This spindle head essentially corresponds to that described previously with reference to FIG. 2. The main difference between these two spindle heads can be seen in the fact that the drive units 1 contain bores 121 in the end faces that face the respective tool receptacles. In this embodiment, eight bores 121 are arranged within equal distances from one another on an imaginary circle around the longitudinal axis of the drive unit 1.

Figure 6:
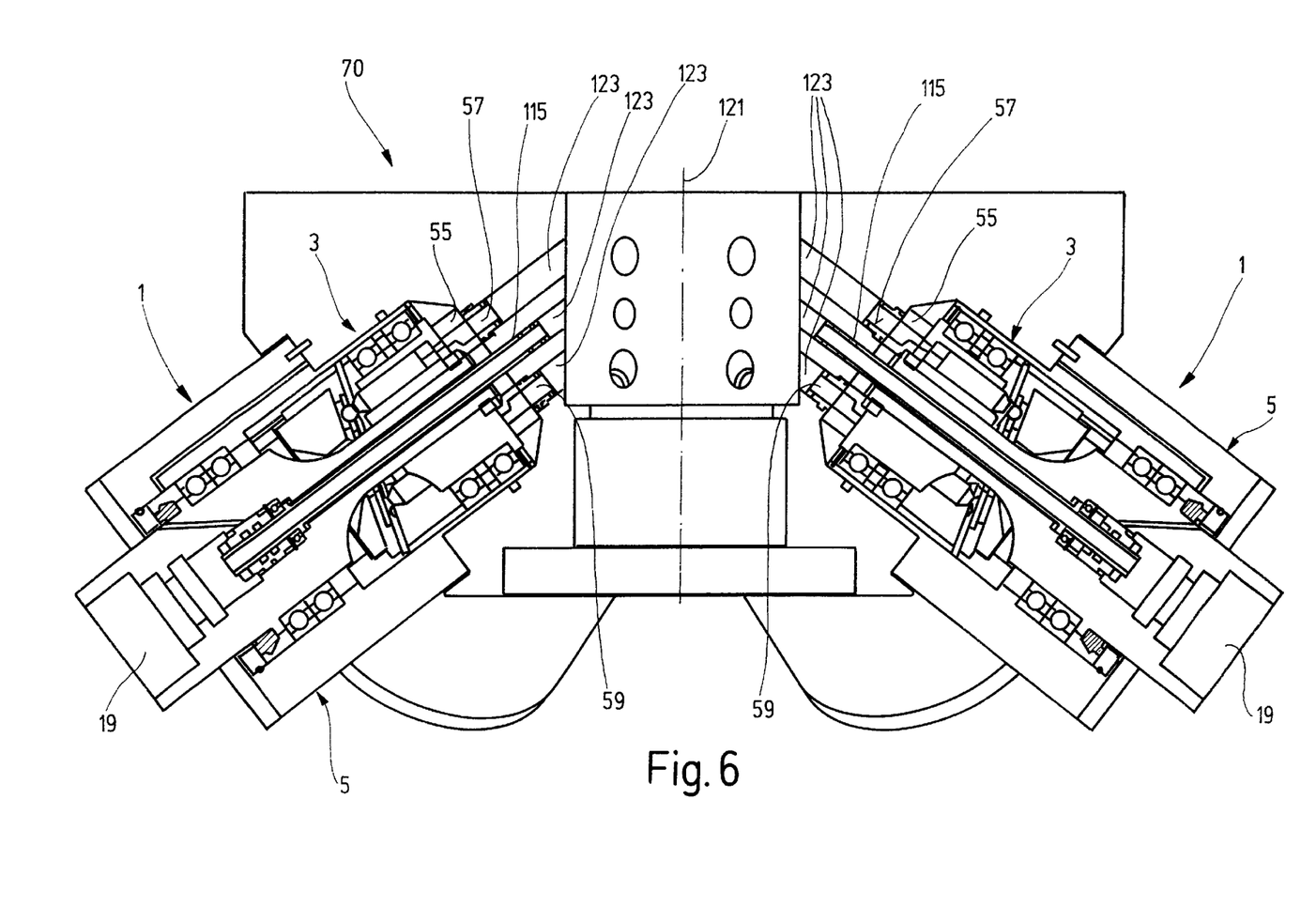
FIG. 6, a schematically sectioned side view of a spindle head with two drive units according to FIG. 4.

FIG. 6 shows a schematically sectioned side view of a spindle head 70 with two drive units 1. The two drive units 1 correspond to the drive unit shown in FIG. 4. Channels 123 which extend transverse to an axis 121 are provided in the spindle head 70. These channels communicate with the inlet channel 57, the outlet channel 59 and the connecting channel 115, respectively. They produce a connection with not-shown supply channels that centrally extend in the spindle head 70.

What is claimed is:

1. A machine tool apparatus for machining workpieces, comprising:
    a spindle housing having a spindle shaft including a tool receptacle configured to receive at least one tool, said spindle housing having a bore configured to receive an operating medium to lubricate and cool moving parts, wherein the bore is in fluid communication with bearings and is configured for discharging at least some of said operating medium from the housing to thereby lubricate and cool said moving parts;
    a drive device configured to impart a rotating motion directly to the spindle shaft, wherein the drive device comprises a hydraulically driven displacement machine having a cylinder block;
    wherein the cylinder block includes said opening configured to receive an operating medium, at least one piston in communication with the opening, and a bore directly receiving the spindle shaft to provide power to the spindle shaft without the use of a drive shaft between the spindle shaft and the drive device, such that operation of the drive device using the operating medium received by the opening causes rotation of the cylinder block and rotation of the spindle shaft received within the bore of the cylinder block;
    wherein the spindle housing comprises a hole and an annular groove in fluid communication with the hole; and
    wherein the spindle shaft comprises a recess in fluid communication with the annular groove and the tool receptacle such that an operating fluid to lubricate and cool is free to flow through the hole, groove, and recess to the tool receptacle, so as to provide a continuous pathway for flow of the operating fluid to lubricate and cool, such that the operating fluid to lubricate and cool can lubricate and cool the at least one tool.

2. The machine tool according to claim 1, wherein the drive device comprises a swash-plate machine.

3. The machine tool according to claim 1, wherein the drive device and the spindle housing form a drive unit.

4. The machine tool according to claim 3, wherein the machine tool further comprises:
    a spindle head supporting the drive unit.

5. The machine tool according to claim 4, further comprising:
    a plurality of the drive units, wherein the spindle head supports the plurality of the drive units.

6. The machine tool according to claim 1, wherein the displacement machine has an adjustable displacement volume.

7. The machine tool according to claim 6, wherein the drive device has a drive speed and a drive torque which can be varied by adjusting the displacement volume of the displacement machine.

8. The machine tool according to claim 1, wherein the tool receptacle and spindle shaft are integrally connected.

9. The machine tool according to claim 1, wherein the operating medium comprises hydraulic fluid within the drive device, wherein the drive device has a drive speed and a drive torque which can be varied by adjusting volume flow of the hydraulic fluid.

10. The machine tool according to claim 1, wherein the operating medium comprises hydraulic fluid within the drive device, wherein the drive device has a drive speed and drive torque which can be varied by adjusting pressure of the hydraulic fluid.

11. A machine tool apparatus for machining workpieces, comprising:
    a spindle housing having a bore configured to receive hydraulic fluid to lubricate and cool moving parts, wherein the bore is in fluid communication with bearings and is configured for discharging at least some of said hydraulic fluid from the housing to thereby lubricate and cool the moving parts;
    a spindle shaft supported by the spindle housing, the spindle shaft having a tool receptacle adapted to receive at least one tool and a recess in fluid communication with the tool receptacle to deliver lubricant to the receptacle to lubricate and cool a tool received within the receptacle; and
    a hydraulically operated drive device configured to impart rotation to the spindle shaft;
    wherein the drive device comprises a hydraulic fluid inlet adapted to supply the hydraulic fluid to the drive device to operate the drive device and a cylinder block connected with the spindle shaft such that the operation of the drive device causes rotation of the cylinder block and the connected spindle shaft, wherein the cylinder block includes an opening configured to receive said hydraulic fluid and at least one piston in communication with the opening.

12. The machine tool according to claim 11, wherein the spindle housing, spindle shaft, and drive device form a drive unit, and wherein the machine tool further comprises:
    a plurality of the drive units; and
    a spindle head supporting the plurality of the drive units.

13. A machine tool apparatus for machining workpieces, comprising:
    a spindle housing having bearings in fluid communication with a supply of operating fluid for lubrication of the bearings, the spindle housing further having a bore in fluid communication with the bearings and configured for discharging at least some of said operating fluid from the housing to thereby lubricate and cool moving parts;

a spindle shaft supported by the bearings of the spindle housing, the spindle shaft having a tool receptacle in communication with a recess in the shaft, wherein the recess is configured to supply lubricating fluid to the tool receptacle for lubrication of a tool within the tool receptacle; and a hydraulically operated drive device having a cylinder block, wherein the cylinder block includes an opening configured to receive said operating fluid and at least one piston in communication with the opening, and wherein the cylinder block directly engages the spindle shaft without using a drive shaft between the spindle shaft and the drive device, such that operation of the drive device using said operating fluid received by the opening causes rotation of the cylinder block and corresponding rotation of the spindle shaft engaged with the cylinder block.

14. A machine tool apparatus for machining workpieces, comprising:

a spindle shaft having a tool receptacle configured to receive a tool and in fluid communication with a first supply of operating fluid so as to provide lubrication and cooling to a tool;

a fluid-operated drive device directly engaged with the spindle shaft to directly drive the spindle shaft without use of a drive shaft therebetween, wherein the drive device includes an opening in fluid communication with a second supply of operating fluid so as to provide fluid power for operation of the drive device, wherein the drive device includes a cylinder block configured to receive said operating fluid from said opening and at least one piston in communication with the opening;

a spindle housing supporting the spindle shaft and having a bore configured to receive fluid to lubricate and cool moving parts within the spindle housing and configured to discharge at least some of said fluid from the spindle housing to thereby lubricate and cool the moving parts; and bearings located between the spindle housing and the spindle shaft, wherein the bearings are in fluid communication with the bore.

15. The machine tool apparatus as recited in claim 14, wherein the cylinder block directly engages the spindle shaft without using a drive shaft between the drive device and the spindle shaft.

* * * * *